(12) United States Patent
Toms et al.

(10) Patent No.: US 9,101,207 B2
(45) Date of Patent: Aug. 11, 2015

(54) FOLDABLE SUPPORT MECHANISM

(71) Applicant: Impey Showers Ltd., Shropshire (GB)

(72) Inventors: Matthew Jason Toms, Somerset (GB); Ian James Harris, Axbridge (GB)

(73) Assignee: IMPEY SHOWERS LTD., Shropshire (GB)

( * ) Notice: Subject to any disclaimer, the term of this patent is extended or adjusted under 35 U.S.C. 154(b) by 0 days.

(21) Appl. No.: 13/708,490

(22) Filed: Dec. 7, 2012

(65) Prior Publication Data

US 2013/0161463 A1    Jun. 27, 2013

(30) Foreign Application Priority Data

Dec. 9, 2011  (GB) .................................. 1121305.5
Feb. 21, 2012  (GB) .................................. 1202993.0

(51) Int. Cl.
| | | |
|---|---|---|
| A47G 29/02 | (2006.01) | |
| A47B 5/04 | (2006.01) | |
| F16M 13/02 | (2006.01) | |
| A47K 3/28 | (2006.01) | |
| A47C 4/04 | (2006.01) | |
| A47C 1/126 | (2006.01) | |

(52) U.S. Cl.
CPC . *A47B 5/04* (2013.01); *A47C 1/126* (2013.01); *A47C 4/04* (2013.01); *A47K 3/282* (2013.01); *F16M 13/022* (2013.01)

(58) Field of Classification Search
USPC ............... 248/240, 97, 80, 503.1, 688, 240.4; 108/42; 4/611
See application file for complete search history.

(56) References Cited

U.S. PATENT DOCUMENTS

| | | | | |
|---|---|---|---|---|
| 1,712,704 A | * | 5/1929 | Kiser ......................... | 248/240.1 |
| 1,732,782 A | * | 10/1929 | Wasmuth ................... | 248/240.1 |
| 2,245,951 A | * | 6/1941 | Agee .......................... | 248/240.2 |
| 2,792,053 A | * | 5/1957 | Kursman ................... | 248/240.1 |

(Continued)

FOREIGN PATENT DOCUMENTS

| | | |
|---|---|---|
| FR | 2844501 | 3/2004 |
| GB | 2141326 | 12/1984 |

(Continued)

OTHER PUBLICATIONS

IPO Search Report under Section 17, Application No. GB1202993.0 dated Jun. 21, 2012.

*Primary Examiner* — Monica Millner
(74) *Attorney, Agent, or Firm* — Banner & Witcoff, Ltd.

(57) ABSTRACT

A foldable support mechanism attachable to a wall or other fixed support, comprising a platform member movable between a substantially horizontal, deployed position and a substantially vertical, stowed position in which the platform member is adjacent to and substantially parallel to the said wall or other fixed support and in which a support surface of the platform member faces away from the said wall or other fixed support, and a support structure comprising two links, each pivotally connected to the platform member and at least one of which is pivotally connectable directly or indirectly to the said wall or other fixed support, in which the links of the said support structure each include a respective limb, the two limbs being so formed or so positioned that, in the said stowed position, at least a portion of the said limbs lies in substantially the same plane as one another, parallel to the wall or other fixed support, in which the said limbs are shaped or profiled at the regions where they meet in the stowed position.

20 Claims, 19 Drawing Sheets

(56) References Cited

U.S. PATENT DOCUMENTS

| | | | | |
|---|---|---|---|---|
| 3,096,067 A | * | 7/1963 | O'Connell | 108/115 |
| 3,193,848 A | * | 7/1965 | Levy | 4/611 |
| 4,087,127 A | * | 5/1978 | Lotta | 297/14 |
| 4,136,622 A | | 1/1979 | Bue et al. | |
| 4,186,450 A | * | 2/1980 | Rosenberg et al. | 4/661 |
| 4,641,883 A | * | 2/1987 | Kato | 297/184.15 |
| 4,656,678 A | * | 4/1987 | Lipski | 4/578.1 |
| 4,975,991 A | * | 12/1990 | Peterson | 4/579 |
| 5,048,132 A | * | 9/1991 | Rizzo | 4/578.1 |
| 5,328,239 A | | 7/1994 | Yamazaki | |
| 5,329,651 A | * | 7/1994 | Mardero et al. | 4/605 |
| 5,337,525 A | * | 8/1994 | Zaccai et al. | 52/35 |
| 5,465,437 A | * | 11/1995 | Herman | 4/611 |
| 5,467,486 A | * | 11/1995 | Guenther | 4/578.1 |
| 5,590,427 A | * | 1/1997 | Weterings et al. | 4/611 |
| 6,042,178 A | | 3/2000 | Hetherington | |
| 6,065,251 A | * | 5/2000 | Kindrick | 52/36.4 |
| 6,067,671 A | * | 5/2000 | Ginder | 4/578.1 |
| 6,094,756 A | * | 8/2000 | Carter | 4/578.1 |
| 6,131,925 A | * | 10/2000 | Weldon | 280/30 |
| 6,164,726 A | * | 12/2000 | Reeves et al. | 297/452.63 |
| 6,378,142 B1 | * | 4/2002 | Gray | 4/449 |
| 6,807,690 B1 | * | 10/2004 | Satterfield | 4/578.1 |
| 6,842,919 B2 | * | 1/2005 | Wilson et al. | 4/578.1 |
| 2006/0071510 A1 | * | 4/2006 | Jiang | 297/14 |
| 2007/0294816 A1 | * | 12/2007 | Cheng | 4/449 |
| 2008/0229492 A1 | * | 9/2008 | Jamieson | 4/578.1 |
| 2008/0235864 A1 | * | 10/2008 | Masciarelli | 4/611 |
| 2011/0232665 A1 | * | 9/2011 | Barnett, Jr. | 132/200 |

FOREIGN PATENT DOCUMENTS

| | | |
|---|---|---|
| GB | 2203638 | 10/1988 |
| JP | 2003339473 | 12/2003 |

* cited by examiner

FOLDABLE SUPPORT MECHANISM

CROSS REFERENCE TO RELATED APPLICATIONS

This is a United States application corresponding to the following United Kingdom applications incorporated herewith by reference and for which priority is claimed: GB 1121305.5 filed Dec. 9, 2011 entitled "A Foldable Support Mechanism" and GB 1202993.0 filed Feb. 21, 2012 entitled "A Foldable Support Mechanism".

BACKGROUND OF THE INVENTION

The present invention relates to a foldable support mechanism, and particularly (but not exclusively), to a mechanism suitable for use as a seat, a bench, a table or other load-bearing platform.

Foldable support mechanisms find utility in many situations, for example as seats in shower cubicles, or in theatres, cinemas, churches or sports stadia where space is at a premium. It is also known to make fold-away chairs and tables, for example the perching seats in London Taxi Cabs and on the Underground (and elsewhere). Usually such seats are pivoted at the rear edge and tip-up, either under a spring mechanism or a counter balanced linkage. Such seating is of particular value in cinemas and theatres and like venues where it is useful to be able to stand readily to allow others to pass along a row, and a folding seat creates space for this to happen.

Tip-up chairs and tables are also known in a domestic situation, although folding chairs are usually free standing. Desks and tables, pivoted to a wall and having fold-out support arms are also known.

Such constructions, however, are not always the most suitable in all situations, especially where it is necessary to ensure that there are no component parts to manipulate; this is especially the case in shower enclosures not least because the floor may be slippery from the presence of soap or detergent. Also, in common with other situations, it is convenient for the chair or table to fold away to increase the space available for the user, but in a shower environment, it is even more necessary for the folding action to be as complete as possible, that is to place the folded chair or table as closely against the wall with an absolute minimum projection away from the wall in view of the very limited space usually available in a shower enclosure.

SUMMARY OF THE INVENTION

The present invention seeks, therefore, to provide a foldable support mechanism, suitable for use as a chair or a table, or even as a bench, a table or a shelf, which can be moved between a deployed position with a support platform thereof in a substantially horizontal orientation, and a folded-away or stowed orientation with the support platform close to and substantially parallel to a wall.

According to the present invention, there is provided a foldable support mechanism attachable to a wall or other fixed support, comprising a platform member movable between a substantially horizontal, deployed position and a substantially vertical, stowed position in which the platform member is adjacent to and substantially parallel to the said wall or other fixed support and in which a support surface of the platform member faces away from the said wall or other fixed support, and a support structure comprising two links, each pivotally connected to the platform member and at least one of which is pivotally connectable directly or indirectly to the said wall or other fixed support, in which the links of the said support structure each include a respective limb, the two limbs being so formed or so positioned that, in the said stowed position, at least a portion of the said limbs lies in substantially the same plane as one another, parallel to the wall or other fixed support, in which the said limbs are shaped or profiled at the regions where they meet in the stowed position.

In one embodiment of the present invention the links of the said support structure each include a respective limb, the two limbs being so formed or so positioned that, in the said stowed position, they lie in substantially the same plane parallel to the wall or other fixed support.

For this purpose the limbs may be shaped with thinner portions at the region where they cross one another in the stowed position so that said limbs themselves lie flat in substantially the same plane in the stowed position. Alternatively the limbs may be laterally offset or so shaped that they do not cross when in the stowed position.

As mentioned above, this is a particularly important feature in shower enclosures where the limited space, and the potentially slippery floor, make it most important that there should be a minimum encumbrance both to the opening and closing movements and to the space within the shower when the support mechanism is folded away. By orienting the platform member facing outwardly from the wall of the enclosure an uncluttered surface with no protuberance, such as the pivotal connection to the links of the support structure, are exposed towards the user. This is also a valuable feature for stadium seating or seating for use in theatres, cinemas or other venues.

It will be apparent that, for use in a shower enclosure, the most immediately useful kind of support mechanism will be a folding seat, and in order to make a seat structure which is as readily foldable as possible the said two links of the support structure are preferably both pivoted at each end. Such pivoted links may be substantially closed loops, conveniently of generally rectangular form, and thus each having two substantially parallel limbs, so shaped that they lie flat in the same plane in the stowed position of the mechanism. Alternatively the pivoted limbs may be c-shape with at least the end of one limb lying within the bight of the other in the stowed position.

Whatever the form of the links, they may form part of a quadrilateral linkage which is so dimensioned that the platform member, which conveniently forms one of the links of the linkage, is firmly supported by a triangular framework when in the deployed position, and lies substantially flat, with its upper surface facing outwardly, in the stowed position. The quadrilateral linkage may be a closed quadrilateral or an open quadrilateral as will be described in more detail below.

The platform member may, alternatively, be entirely separate from the support structure, in which case the said links are formed in such a way that the platform member may rest thereon or be secured thereto. Alternatively, if the platform member is to form part of the quadrilateral linkage, the said links may be directly pivotally connectable to the platform member.

The links of the quadrilateral linkage forming the support structure may be directly pivotally connected to a wall of the enclosure, or may, alternatively, be pivotally connected to a mounting member in the form of a plate or panel which then itself constitutes one member of the quadrilateral linkage.

The pivotal connection of the said two links to the said platform member may be a permanent pivotal connection, or alternatively, the said two links may be connected to the support platform by releasable connection means to allow this to be easily removed, for example for cleaning or replacement.

Whether formed as a seat, a table or any other structure (such as a bench or shelf) the platform member may have at least one associated upstanding projection. If the foldable support structure is formed as a seat the projection may be an arm rest, and suitably shaped for this purpose. If the foldable support structure is, on the other hand, formed as a worktop, table or shelf, the projection may simply be a terminal barrier to prevent items from falling from the support platform in use thereof. Likewise, when formed as a table top or work surface (or shelf) the perimeter of the platform may have a raised ridge or projection for the purpose of preventing small items from dropping from the surface.

If the foldable support mechanism is formed as a seat there may be a further, padded or unpadded backrest element separately connectable to the wall of the enclosure or other upright fixed support, to be positioned in association with the mounting of the support mechanism.

According to an example, there is provided a foldable support mechanism in which the support structure includes a platform frame and a strut frame. The platform frame can be fabricated in rod-like form. In an example, the platform frame is profiled so as to include upper and lower portions connected at an elbow and subtending an angle to define a portion of the said frame to meet with a corresponding portion of the strut frame. The platform member can include a protuberance to engage with a receiving portion of a wall mount for the mechanism. The receiving portion can be arranged on an upper portion of the wall mount. The receiving portion can include a lip to releasably maintain the protuberance within the receiving portion when the platform is deployed.

According to an example, there is provided a shower seat configurable between a horizontal, deployed position and a vertical, stowed position, the seat including a platform member including a support surface, and a support structure to support the platform member and comprising two links, each pivotally connected to the platform member and at least one of which is pivotally connectable directly or indirectly to a wall or other fixed support, in which the links of the said support structure each include a respective limb, the two limbs being so formed or so positioned that, in the said stowed position, at least a portion of the said limbs lies in substantially the same plane as one another, parallel to the wall or other fixed support, and in which the said limbs are shaped or profiled at the regions where they meet in the stowed position.

According to an example, there is provided a support structure for a seat or other load-bearing platform, the support structure including two links to pivotally connect to the seat or platform, at least one of which adapted to be pivotally connectable directly or indirectly to a wall or other fixed support, in which the links of the said support structure each include a respective limb, the two limbs being so formed or so positioned that, in a stowed position of the said seat or platform, at least a portion of the said limbs lies in substantially the same plane as one another, parallel to the wall or other fixed support, wherein the said limbs are shaped or profiled at the regions where they meet in the stowed position.

For the foldable support mechanism, the platform member can be a table top or working surface. The closed loops can be substantially rectangular. The foldable support mechanism can include an associated back rest separately connectable to a wall of an enclosure, or other upright support member. The links can be fabricated from tubular components. The links can be made using SMC techniques.

BRIEF DESCRIPTION OF THE DRAWING

Various embodiments of the present invention will now be more particularly described, by way of example, with reference to the accompanying drawings, in which.

DESCRIPTION OF EMBODIMENTS OF THE INVENTION

Figure 1:
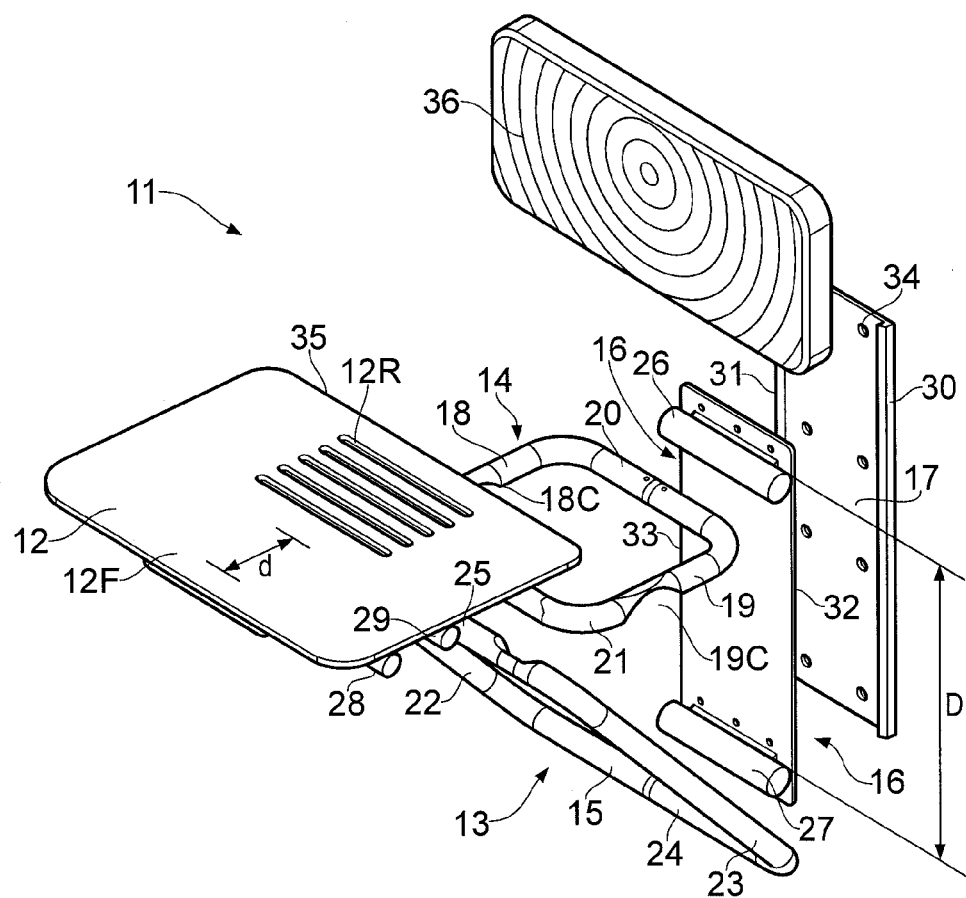
FIG. 1 is an exploded perspective view from the front and one side of a first embodiment of the invention.
Figure 2:
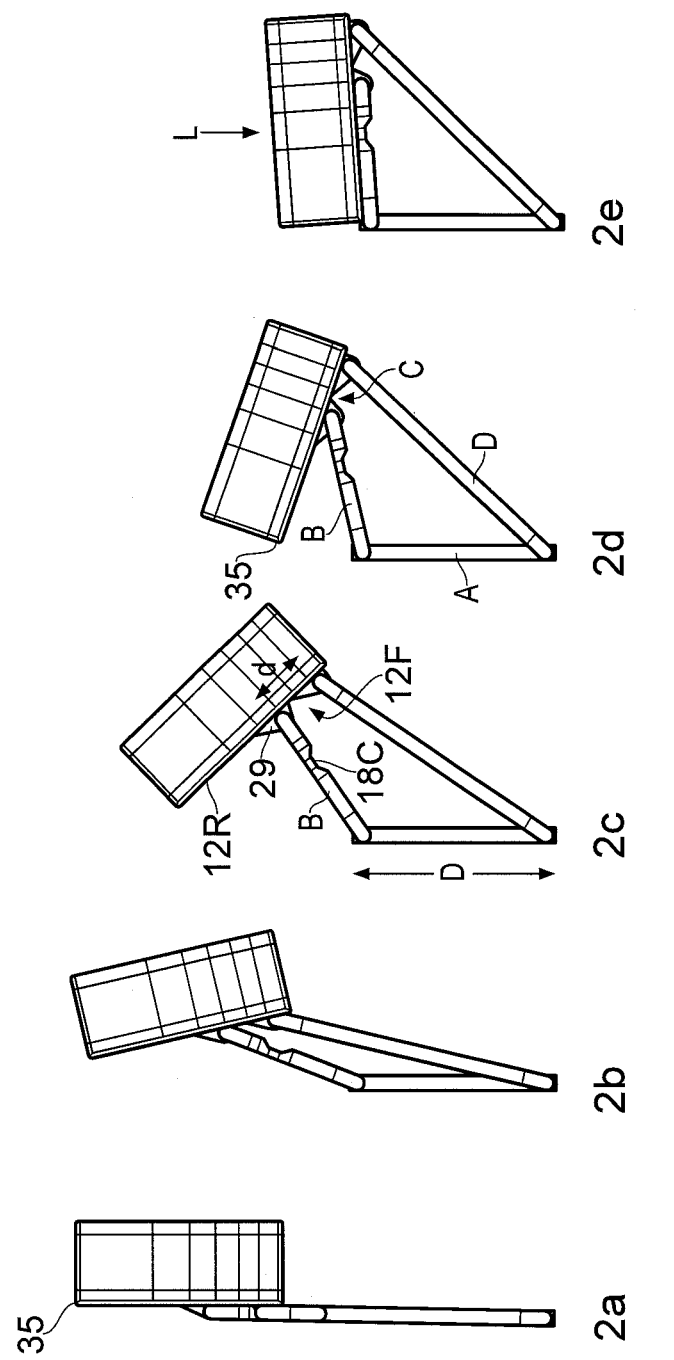
FIG. 2 is a schematic set of side views 2a-2e illustrating the foldable support mechanism of the present invention in five different positions between fully deployed and fully stowed.
Figure 3:
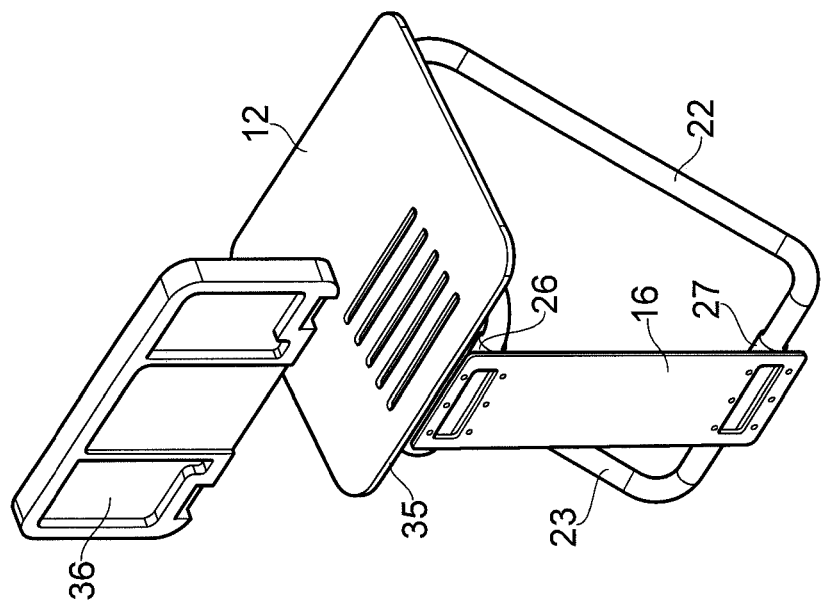
FIG. 3 is a perspective view from the rear and one side of the embodiment of FIG. 1 illustrated in the fully deployed position.

Referring now to the drawings, and particular to FIGS. 1, 2 and 3 thereof, the embodiment shown comprises a folding support mechanism generally indicated 11 suitable for use as a seat such as in a shower enclosure. The mechanism 11, as can be seen particularly in FIG. 1, comprises a platform member 12, in this embodiment a seat, carried on an underlying support structure generally indicated 13 in the form of two generally rectangular support frames, comprising a platform support frame 14 and a strut frame 15, the two frames 14, 15 are made of tubular material, typically metal, although other materials of sufficient strength may also be employed. The support structure 13 is completed by a wall mount 16 and an attachment plate 17.

The rectangular platform support frame 14 is composed of two parallel generally rectilinear side arms 18, 19 joined respectively at one end to first pivot limb 20 and at the other end to a second pivot limb 21. The pivot limb 20 may be considered as a fixed pivot limb and the limb 21 may considered as a seat pivot limb as will be described in more detail below.

The rectangular strut frame 15, comprises two lateral strut arms 22, 23 and two transverse pivot limbs 24, 25 which, as in the case of the seat frame 14, may be considered as a fixed pivot limb 24 and a seat pivot limb 25.

The support structure 13 is carried on the mounting plate 16 by means of upper and lower tubular bearings 26, 27 in which the fixed pivot limbs 20 and 24 of the seat support frame 14 and the strut frame 15 respectively are carried. Each of the frames 14, 15 is fabricated from a plurality of right angle tubular elbow elements joined together in such a way that the fixed pivot limbs 20, 24 of the frames 14, 13 can be introduced into the bearing tubes 26, 27 respectively, to form a secure pivotal connection respectively between the frame 14, 15 and the mounting plate 16.

Likewise, the platform member 12 has front and rear tubular bearings 29,28 in its underside. These tubular bearing 28, 29 are of similar form to the tubular bearings 26, 27. Correspondingly the seat pivot limbs 21, 25 of the frames 14, 15 can be introduced into the tubular bearings 29, 28 by introducing respective ends of elementary elbow components of the frames into respective ends of the tubes. The upper tubular bearing 26 on the mounting plate 16 and the rear tubular bearing 28 on the seat platform 12 could be relatively shorter than the corresponding lower tubular bearing 27 on the mounting plate 16 since the former is intended to carry the corresponding limbs of the seat frame 14 which is of smaller dimensions than the corresponding limbs of the strut frame 15 although they have been shown in this embodiments to be the same size.

The wall mounting plate 17 has two lateral channels 30, 31 facing inwardly to receive respective edges 32, 33 of the mounting plate 16. In use, therefore, the wall plate 17 is secured at an appropriate height to a fixed enclosure wall, by means of a significant number of robust fixing elements, for example passing through holes 34 in the fixing plate 17. Then the mounting plate 16 can be positioned thereon by sliding it vertically with its edges 32, 33 in the channels 30, 31. These latter channels are closed at the lower ends so that the bottom of the mounting plate 16 rests against them with the mounting plate 16 and fixing plate 17 in substantial juxtaposition.

As can be seen in FIGS. 2a to 2e, the dimensions of the two frames 14, 15 and the relative separation d of the two seat bearings 28, 29, together with the relative separation D of the two fixed bearings 26,27, results in the formation of a quadrilateral linkage comprising four arms A, B, C and D as illustrated in FIG. 2d. The seat platform 12 has a front region 12F and a rear region 12R separated by the rear bearing tube 29; the front part 12F forms the limb C of the quadrilateral linkage and the rear part 12R is free, but resting on the limb B when the seat is in the fully deployed position illustrated in FIG. 2e in which position the two arms B and C of the quadrilateral linkage lie parallel to one another in substantial alignment so that any load L on the seat 12 experiences the support of a triangular linkage comprising arms A, D and (B+C).

To stow the seat 12 from its deployed position illustrated in FIG. 2e, the rear edge 35 of the seat 12 is raised, causing the frame limbs 18, 19, which constitutes the arm B of the quadrilateral linkage, to turn about their pivotal connection on the tubular bearing 26 of the mounting plate 16 anticlockwise as shown in FIG. 2d. As the rear edge 35 of the seat 12 is raised further, this rotation of limb B continues accompanied by an anticlockwise rotation of the limb D about its connection to limb A, that is rotation of the frame limbs 22, 23 constituting the lateral struts of the strut frame 15 turning about the axis defined by the tubular bearing 27. This continues until the limb B is flat against the wall as can be seen in FIG. 2a. This position can be reached because the limbs 18, 19 of the seat support frame 14 each have a cavity 18c, 19c, for example formed by partly crushing the tube, whilst the pivot limb 25 of the strut frame 13 has corresponding cavities 25c (only one of which can be seen in FIG. 1) at the points along its length where it crosses the seat frame limbs 18, 19 and facing towards the cavities 18c, 19c respectively so that, as can be seen in FIG. 2a, when the structure is in the fully stowed position the frame arms 18, 19 enter the cavities 25c and the pivot limb 25 enters the cavities 18c, 19c.

As can be seen in FIG. 3 a separate backrest 36 may be secured to the wall independently of the seat, to provided added comfort for a user.

Figure 4:
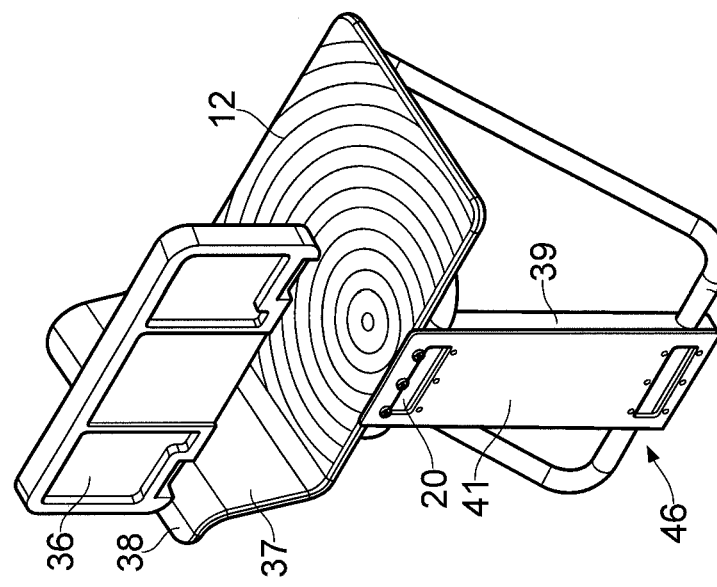
FIG. 4 is a similar perspective view from the rear and one side of an alternative embodiment of the invention.

FIG. 4 illustrates an alternative embodiment, in which the same or corresponding reference numerals are used to identify the same or corresponding components. Here the seat platform 12 has a lateral upstanding integral wall 37 with a curved roll-over top 38 to form an armrest. The fixed pivot limb 20 of the seat frame 14, and the fixed strut frame pivot limb 24 pass through respective aligned openings in lateral flanges 29,40 of a mounting plate 41 intended for direct attachment to the wall.

Figure 5:
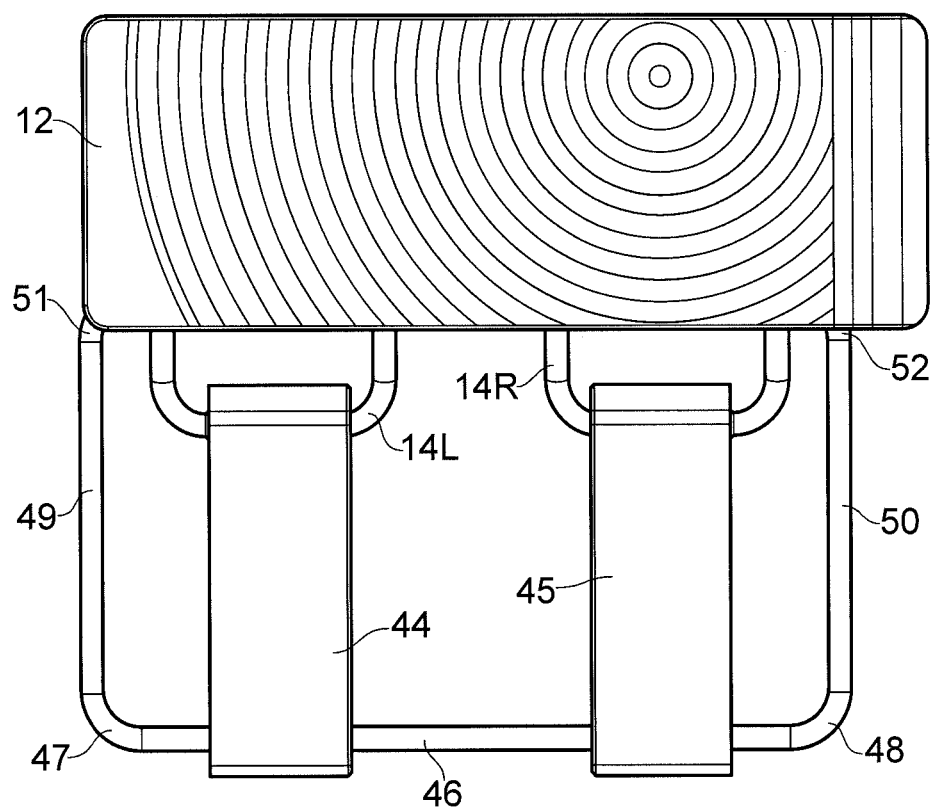
FIG. 5 is a frontal view of an alternative embodiment of the invention, formed as a bench, illustrated in the fully stowed position.

In the embodiment of FIG. 5 a seat platform 12 of elongate rectangular form is supported by two sets of seat frame members 14L and 14R pivotally mounted to respective wall mounts 44, 45 which carry a fixed strut frame pivot member 46 joined by corner members 47, 48 to respective lateral struts 49,50 pivotally mounted at their upper ends 51, 52 to respective pivoting attachments (not illustrated) by which they are pivotally secured to the front edge of the seat panel 12. Each of the pivoted seat frames 14L, 14R acts in the same way as the seat frame 14 in the embodiment of the FIGS. 1 to 4 to form, with the seat 12, the side struts 49,50 and the wall panels 44,45 a quadrilateral linkage which allows the seat 12 to be moved to a deployed orientation substantially horizontally where it is supported by the two support frames 14L and 14R and the lateral struts 49, 50.

Figure 6:
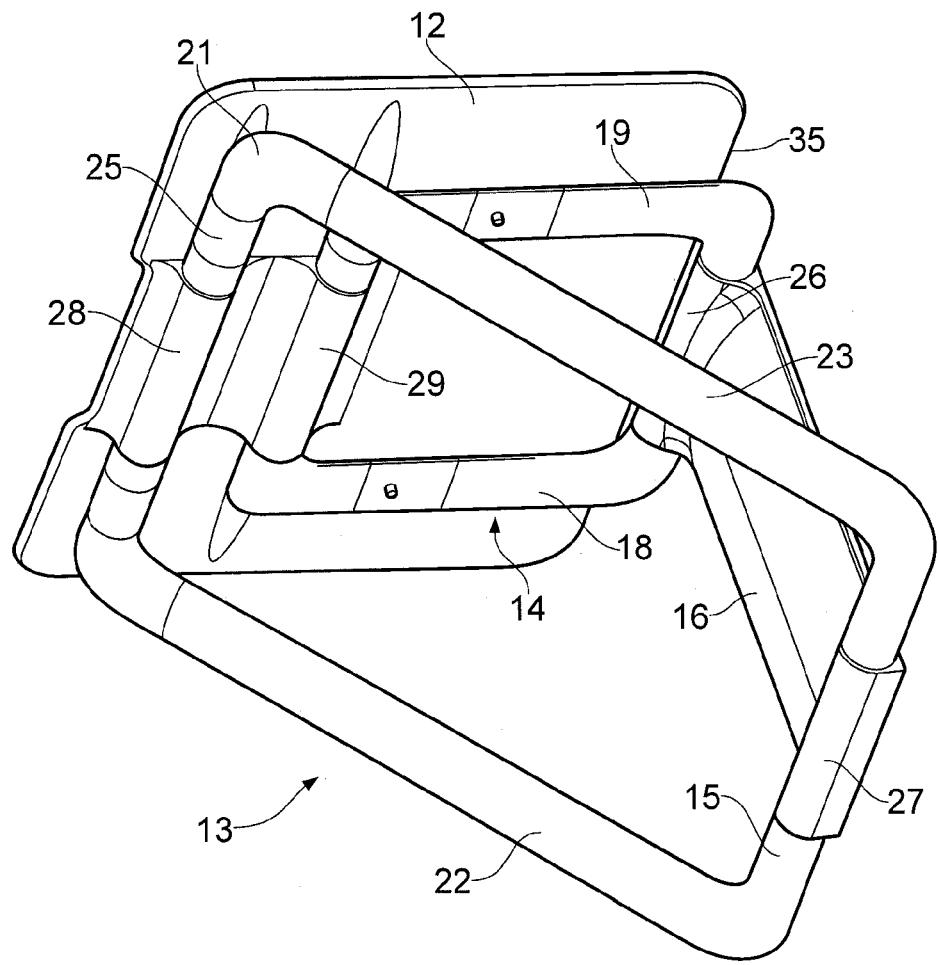
FIG. 6 is a perspective view from below of a further embodiment of the invention, shown in the deployed position.
Figure 7:
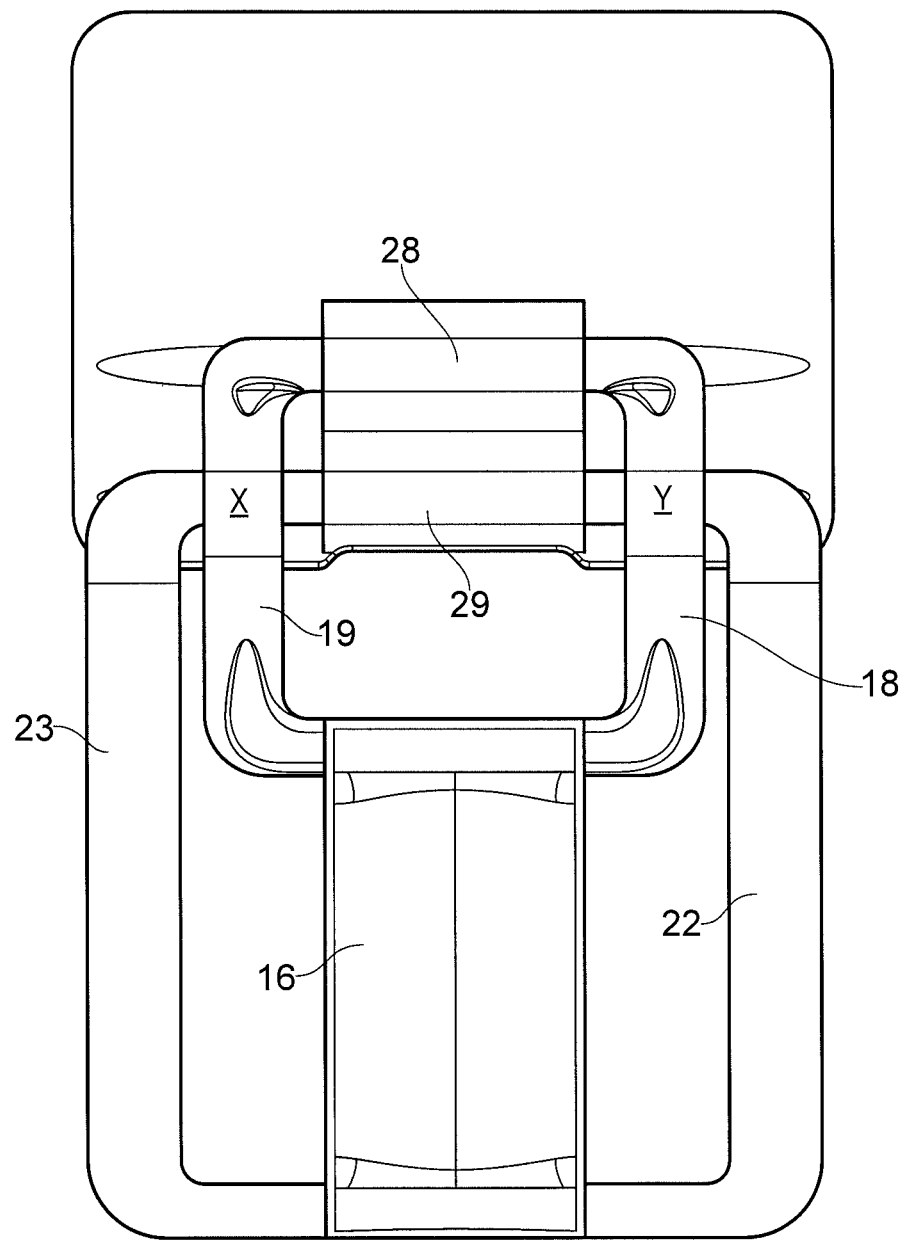
FIG. 7 is a rear face view of the embodiment of FIG. 6, shown in the stowed position.
Figure 8:
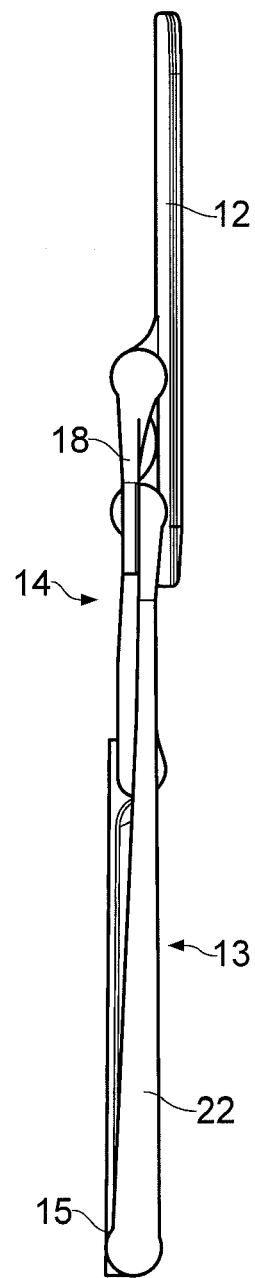
FIG. 8 is a side view of the embodiment of FIGS. 6 and 7, shown in the stowed position.

The embodiment of FIGS. 6, 7 and 8 operates in substantially the same way, but the support frame members are shaped mouldings made using SMC techniques. Those components which fulfill the same or a corresponding function to corresponding components of the embodiments of FIGS. 1 to 5 have been identified with the same reference numerals. Thus, as seen in FIG. 6, a seat platform 12 is supported on a seat support frame 14 comprising parallel lateral limbs 18, 19 joined by a fix frame limb (which cannot be seen in FIG. 6 as it lies within the tubular bearing 26) and a seat frame limb which lies within a tubular bearing 29 secured to the seat 12 or integrally moulded therewith.

A front tubular bearing 28 carries a pivot limb 25 of the strut frame 13, which is joined by two strut limbs 22, 23 to the fixed pivot limb 15 carried in a tubular bearing 27 at the lower end of a fixing plate or mount 16 by which the whole assembly is secured to an upright support or a wall.

Because the frame members are made of SMC the arrangement for ensuring flat folding of the structure is slightly different. As can be seen particularly in FIG. 8, at the point where the seat frame support limbs 18, 19 cross the front pivot limb 25 of the strut frame 13, which points are marked X and Y in FIG. 7, the frame arm mouldings are not fully circular, but rather are semi-circular in cross section, as can be seen in particular in FIG. 8, with their flat sides facing one another so that the intersection point defines a complete circular profile. These flat portions are not made as sharp indents, but rather as gently tapered portions tapering from the fully round cross section adjacent the fixed pivot limb 15.

Figure 9:
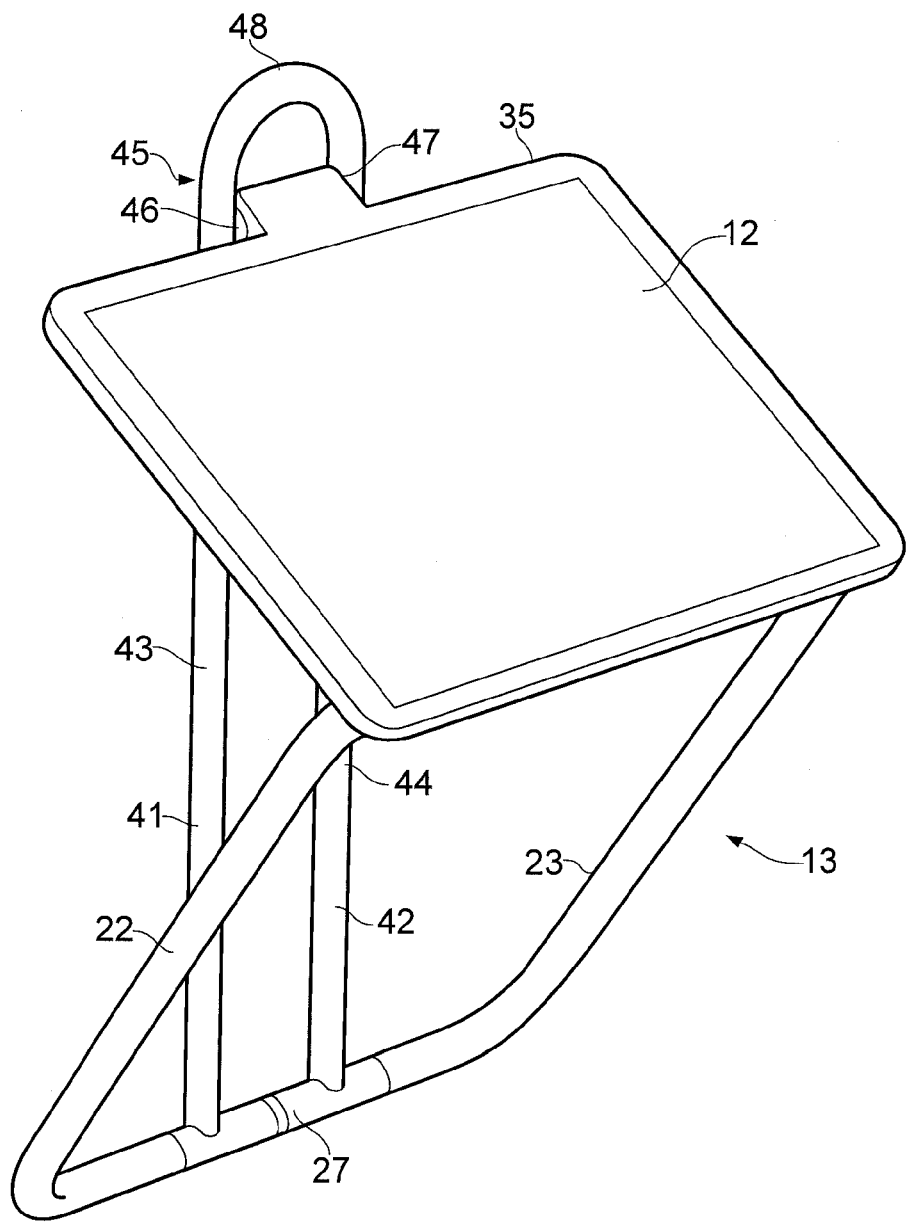
FIG. 9 is a perspective view from above and one side of a further embodiment of the invention, illustrated part way between the stowed and the deployed positions.
Figure 10:
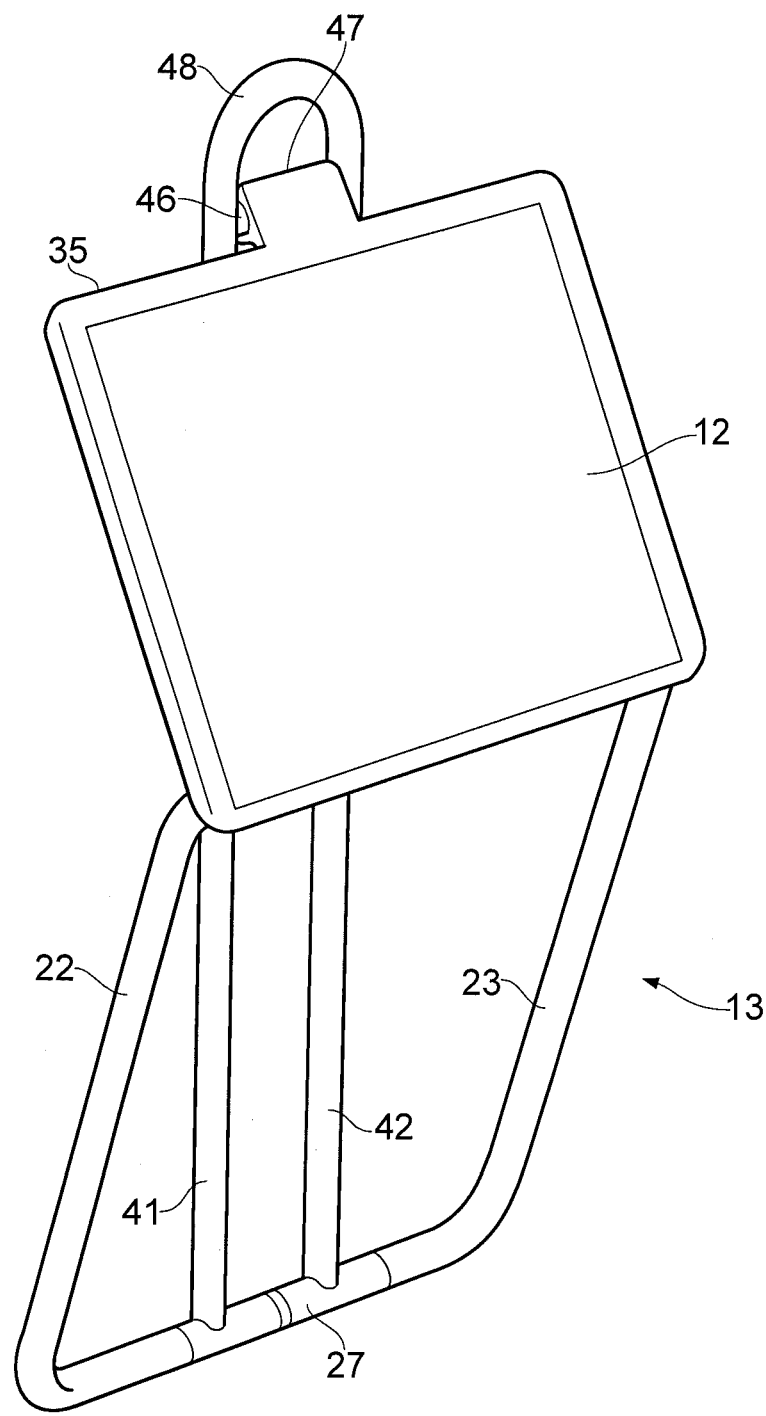
FIG. 10 is a view similar to that of FIG. 9, showing the embodiment in a position close to the stowed position.

The embodiment of FIGS. 9 and 10 functions on a slightly different principle within the overall general concept of the invention. In this embodiment the platform 12 is pivotally mounted at or adjacent its front edge to a strut frame 13 comprising parallel strut limbs 22, 23 pivotally mounted at their lower ends to a bearing 27 which allows the strut frame 13 to turn about an axis defined thereby.

However, in place of the mounting 16 there are two upright tubular supports, 41, 42 the upper ends of which are telescopically engaged in the lower ends 43, 44 of an inverted u-shape support frame 45 having a transverse bearing 46 to which a rearward projection 47 of the seat platform 12 is pivotally connected.

The upright tubular supports 41, 42 are, in use, fixed (by means not shown) to a fixed support such as a wall or an upright structure, and the inverted u-shape tubular frame 45 can be moved up and down between a lower deployed position and an upper stowed position. As the inverted u-shape frame 45 is lowered the rear edge 35 of the seat 12 moves downwardly, and the seat platform 12 moves towards a horizontal orientation with the strut arms 22, 23 forming a triangular bracing. The arrangement is such that the seat platform 12 is horizontal when the arms 43, 44 of the inverted tubular frame 45 reach their lowermost position, defined, for example, by internal abutment stops (not shown). To fold the seat to its stowed position it is simply necessary to grasp the bight portion of the inverted u-shape support strut 45 and raise it towards the position illustrated in FIG. 10 which shows the structure approaching its stowed position. Then, finally, by pushing the forward edge (now the lower edge) of the seat platform 12 towards the wall complete stowage of the structure can be achieved.

Figure 11:
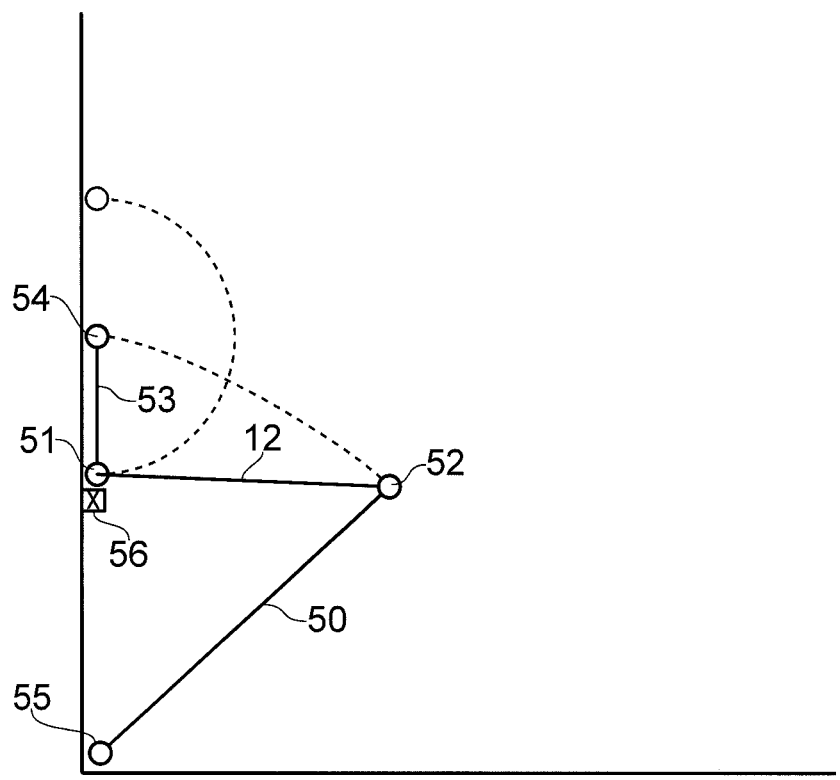
FIG. 11 is a schematic view of a further alternative embodiment.

FIG. 11 schematically illustrates a further alternative configuration in which a seat platform 12 is pivotally connected at or adjacent its front edge to a strut 50, which may be a rectangular frame like the frame 13 of the embodiment of FIG. 1. However, the rear edge of the seat platform 12 is pivotally connected at 51 to a suspension link 53 which is itself pivotally connected at 54 to the wall or other upright support. In order to provide secure support the rear edge of the seat platform 12 is engaged by a latch or lock 56 fixed to the wall or other upright support to resist any tendency of the seat to pull forward when a user is seated on the seat and the link 50 thus experiences a clockwise movement (as viewed in FIG. 10).

To stow the seat the lock or latch 56 is released, the front edge of the seat lowered and the rear edge swing outward and upward, by pivoting of the link 52 anticlockwise about the pivot 54 until the pivot 51 is vertically above it. The quadrilateral linkage will lie flat against the wall in the stowed position if the front-to-back dimension of the seat is 2.352 times the length of the link 53, assuming the link 50 lies at 45° in the deployed position.

Figure 12:
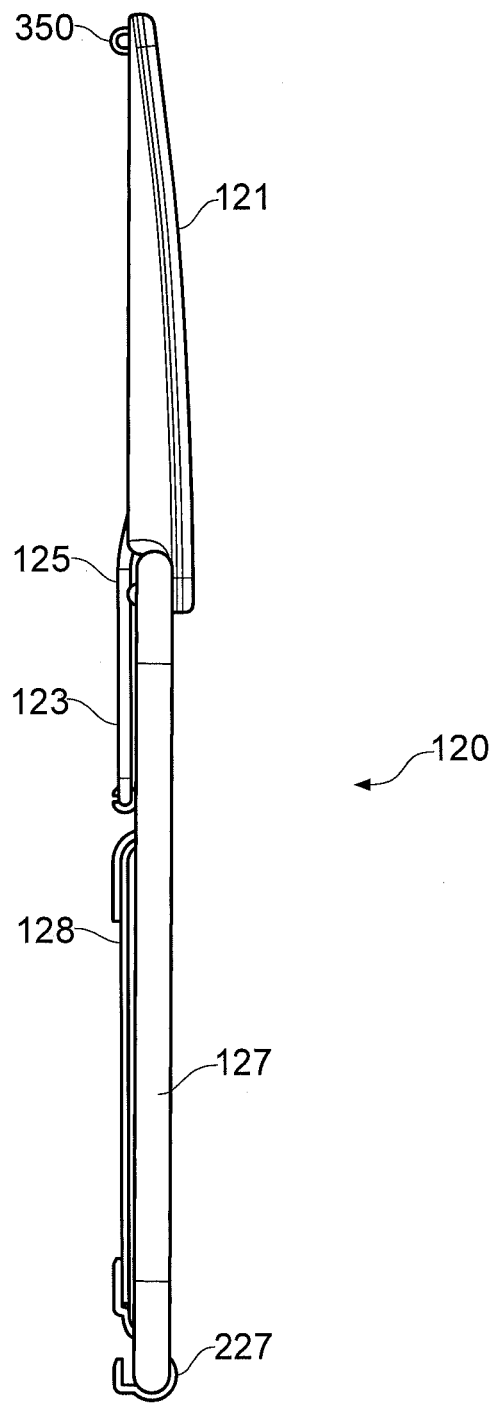
FIG. 12 is a schematic set of side views 12a-12d illustrating a foldable support mechanism according to an example, in multiple different positions between fully stowed and fully deployed.
Figure 12:
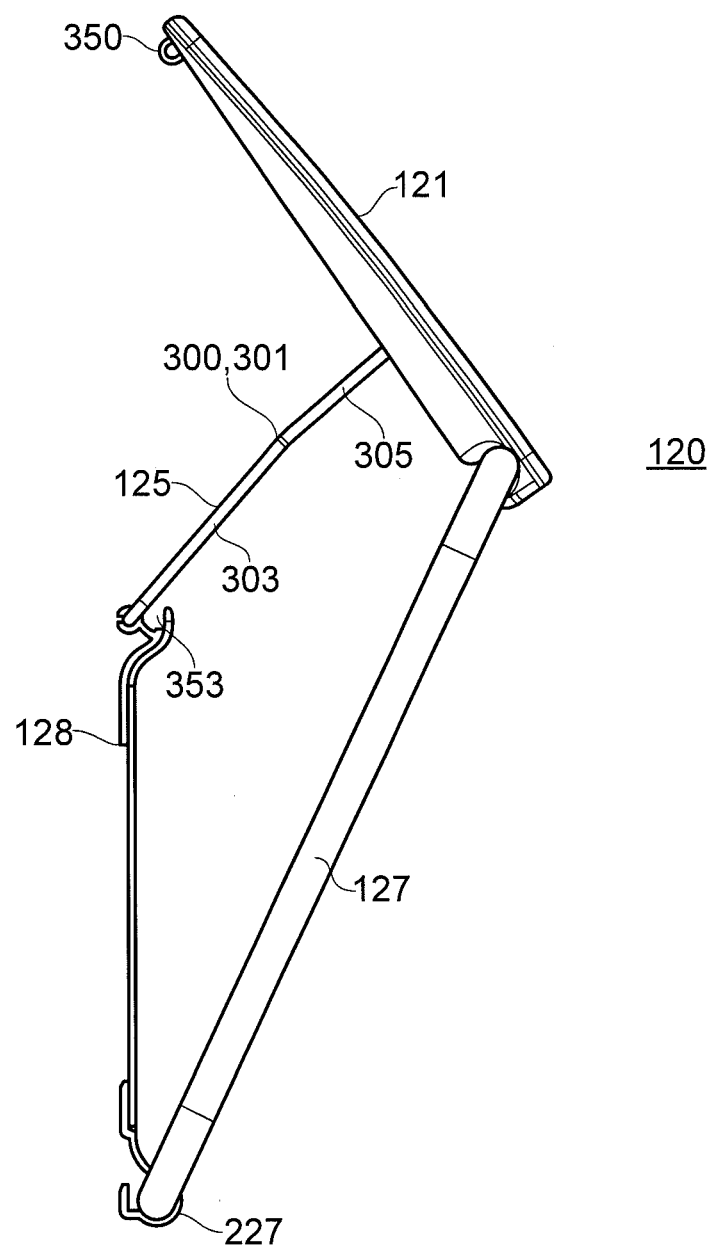
Figure 12C:
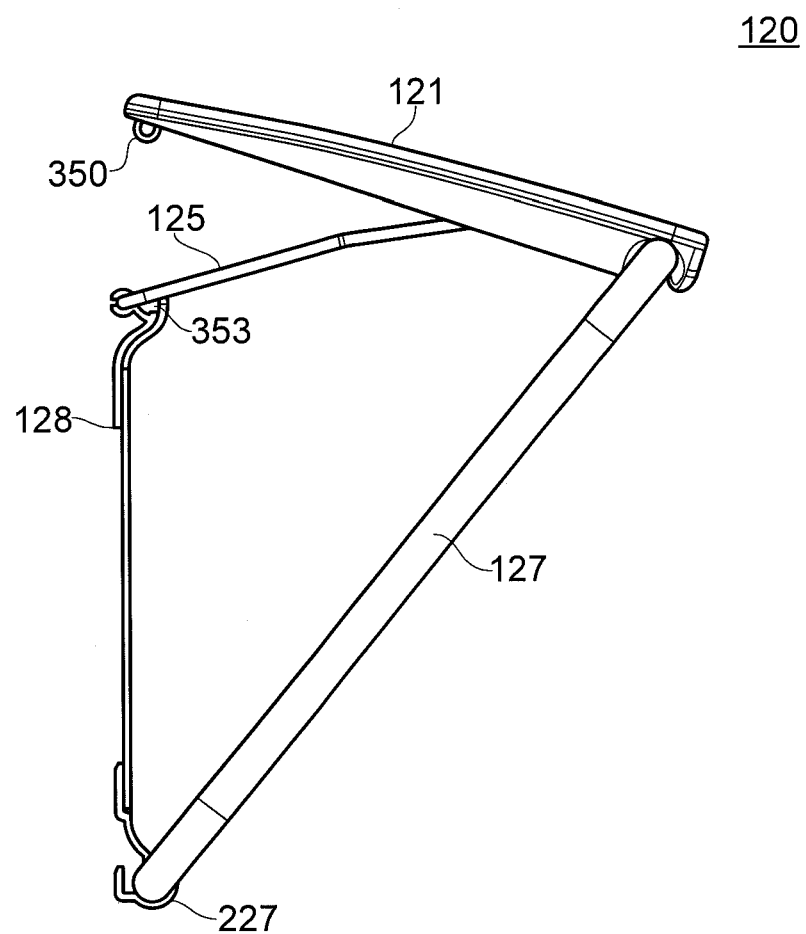
Figure 12:
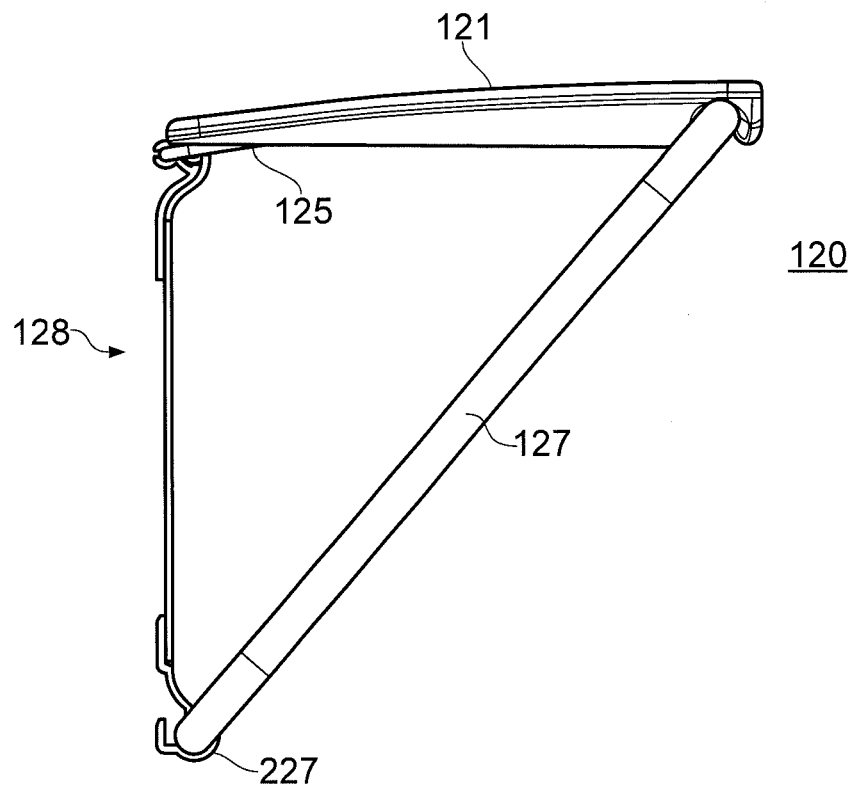

FIG. 12 is a schematic set of side views 12a-12d illustrating a foldable support mechanism according to an example, in multiple different positions between fully stowed and fully deployed.

The embodiment shown comprises a folding support mechanism generally indicated 120 suitable for use as a seat such as a shower seat in a shower enclosure for example. The mechanism 120, comprises a platform member 121, in this embodiment a seat, carried on an underlying structure generally indicated 123. In an example, the structure 123 includes two frames; a platform frame 125 and a strut frame 127. A wall mount 128 and is provided for attaching or securing the mechanism to a wall or other suitable structure.

Figure 13:
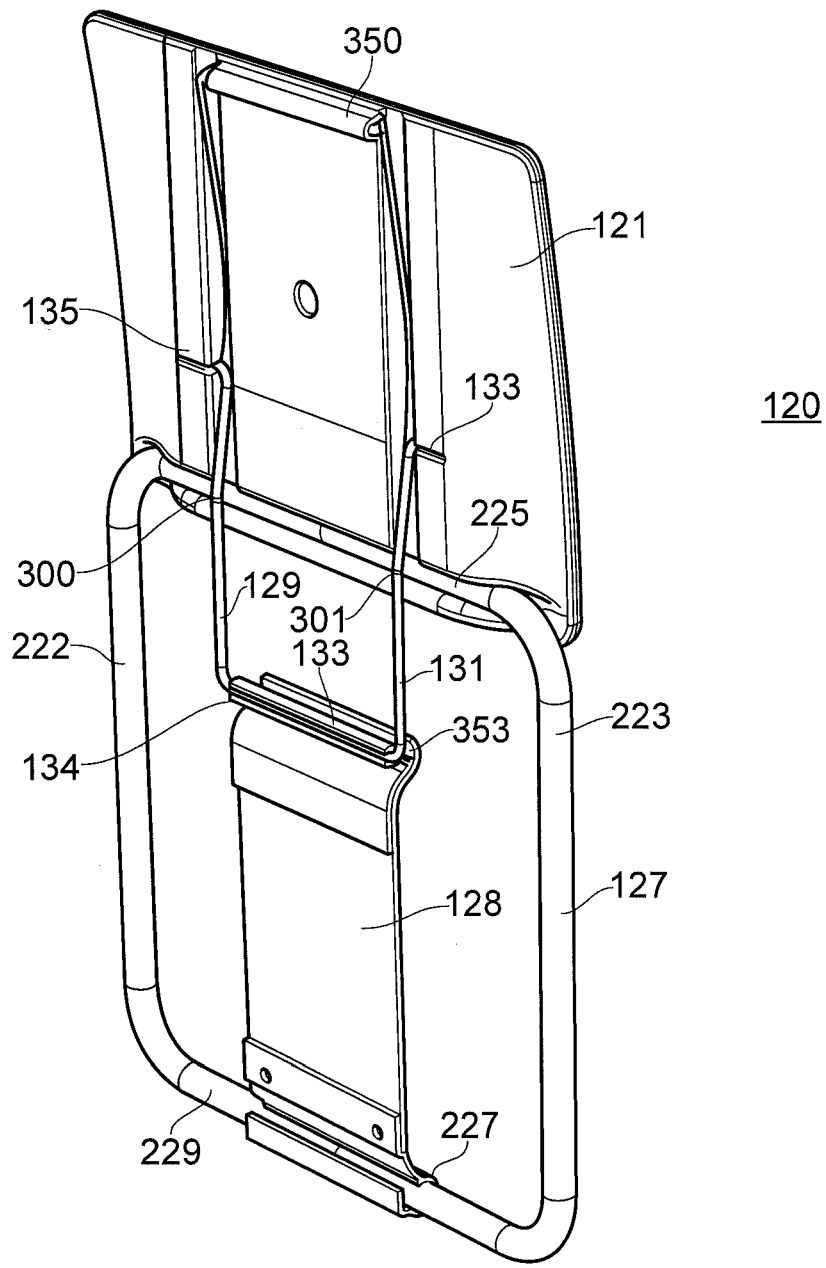
FIG. 13 is a rear perspective view of a foldable support mechanism according to an example in a stowed position.

The platform frame 125 includes two parallel side arms 129, 131 joined respectively at one end to platform member 121, and at the other end to an upper portion of the wall mount 128 (see for example, FIG. 13). Arms 129, 131 can be connected to one another at one or both ends via a lateral arm. In an example, arms 129, 131 are connected via a lateral arm 133 that passes through a receiving channel 134 of the mount 128, whereby to secure the lateral arm, and by extension the parallel arms to the mount 128 whilst allowing pivotal movement thereof. At the platform end, the arms 129, 131 can be profiled to engage into a channel or other receiving portion of the platform for pivotal movement. For example, lateral portions of the arms 129, 131 can slot or otherwise fit into suitably profiled portions 133, 135 on the underside of the platform 121. Other alternatives are possible as will be appreciated. For example, arms 129, 131 can be connected at both ends by respective lateral arms, or can be separate such that, for example, further lateral arms can be used to secure the arms in a desired position.

Strut frame 127, comprises two lateral strut arms 222, 223 and two transverse pivot limbs 224, 225 that can be considered as a fixed pivot limb 224 and a seat pivot limb 225. In an example, strut frame 127 is carried on the wall mount by means of a lower tubular bearing 227 in which the fixed pivot limb 224 is carried.

Strut frame 127 can be fabricated from a plurality of right angle tubular elbow elements joined together in such a way that the fixed pivot limb 224 can be introduced into a bearing tube 227 to form a secure pivotal connection between the strut frame and the wall mount. Tube 227 can be typical cylindrical tubing, or can be provided with an opening such as depicted in FIGS. 12-15, which opening can be used to mate tube 227 with limb 224. For example, limb 224 can be introduced into tube 227 via the opening, and then attached or otherwise secured to a wall.

In an example, platform frame 125 can be fabricated from rods, which can be plastic or metal for example. Arms 129, 131 of frame 125 are shaped in order to allow the platform to stow vertically. More specifically, arms 129, 131 are profiled so that, when in the stowed position, the platform can be substantially vertically stowed. Accordingly, the part of the strut frame 127 that crosses or intersects the arms 129, 131 nests or is received within the profiled portions of the said arms. In an example, portions of the pivot limb 225 of strut frame 127 nest within the profiled portions of the arms 129, 131.

Alternatively, at the points of intersection in the stowed position, the pivot limb 225 can be shaped with thinner portions so that the arms 129, 131 are received in the thinner portions and the platform can be stowed substantially vertically without the points of intersection of the limbs and arms causing the platform to protrude from the wall to which it is mounted any more than desirable in view of the aforementioned advantages relating to space saving and safety for example. Alternatively the limbs may be laterally offset so that they do not cross when in the stowed position.

As can be seen from FIGS. 12a to 12d, the mechanism is depicted in various intermediate stages between a fully stowed position (FIG. 12a) and fully deployed position (FIG. 12d). Referring to FIG. 12b, a side profile of the arms 129, 131 according to an example can be seen, in which the arms include respective elbows 300, 301 at which point the arms bend thereby resulting in each arm including two portions that subtend an angle. In an example, and referring only to one arm for clarity, the angle can be selected so that portions of the pivot limb 225 are received at the elbow 300 with the lower portion 303 being substantially parallel to the platform and lateral strut arms 222, 223 when the mechanism is stowed. The upper portion 305 extends into the base of the platform, and thus, when the platform is stowed, the upper portion 305 is not parallel to the platform or lateral strut arms 222, 223.

Other alternatives are possible. For example, the arms 129, 131 can be generally straight but include a female section to receive portions of the pivot limb 225 when the platform is stowed. The female sections can be circular in profile to accommodate the limb, or can have any other shape suitable for mating with the limb 225 depending on its cross-section and size.

In an example, the overarching principle is to enable the mechanism to stow so that all components are as flush as possible to a wall or other structure to which the mechanism is mounted, whilst enabling the platform to be suitably deployed such that it provides a safe and suitable seat.

As can be seen in the figures, platform 121 can include a protuberance 350 positioned at an edge of the platform which is uppermost when stowed, and thus nearest to the wall when deployed. A corresponding receiving portion 353 for the protuberance 350 can be provided on the wall mount. According to an example, when deployed, protuberance 350 rests within portion 353 thereby supporting the platform at the point at which is closest to the wall and effectively locking the platform into position so that unwanted movements of the platform are avoided.

In an example, protuberance 350 is semi-circular, and portion 353 is correspondingly profiled so that protuberance 350 rests within portion 353 without any play. Portion 353 can be profiled to include a lip that resists entry of protuberance 350 such that some moderate force is required to mate the two. Accordingly, the two will snap together thereby forming a secure connection, with a corresponding effort required to bring the two out of engagement with one another. In this way, the two parts form a releasable locking mechanism for the platform that acts to hold it in position whilst providing a support for the platform when deployed by distributing some weight across the width of the top portion of the mount.

FIG. 13 is a rear perspective view of a foldable support mechanism according to an example when in a stowed position. Protuberance 350 is visible. As can be seen, arms 129, 131 include a lateral arm that is engaged into a channel formed on the uppermost portion of the wall mount adjacent to portion 353. As depicted, lateral portions of the arms 129, 131, which extend outwardly, are pivotally engaged into portions 133, 135 on the underside of the platform 121. In an example, the portions 133, 135 can be narrower at their respective openings than a width of the lateral portion such that force is required to fit the lateral portions of the arms into the portions 133, 135 such they cannot work free in use, similarly to the lateral arm that is engaged into the channel formed on the uppermost portion of the wall mount adjacent to portion 353.

Figure 14:
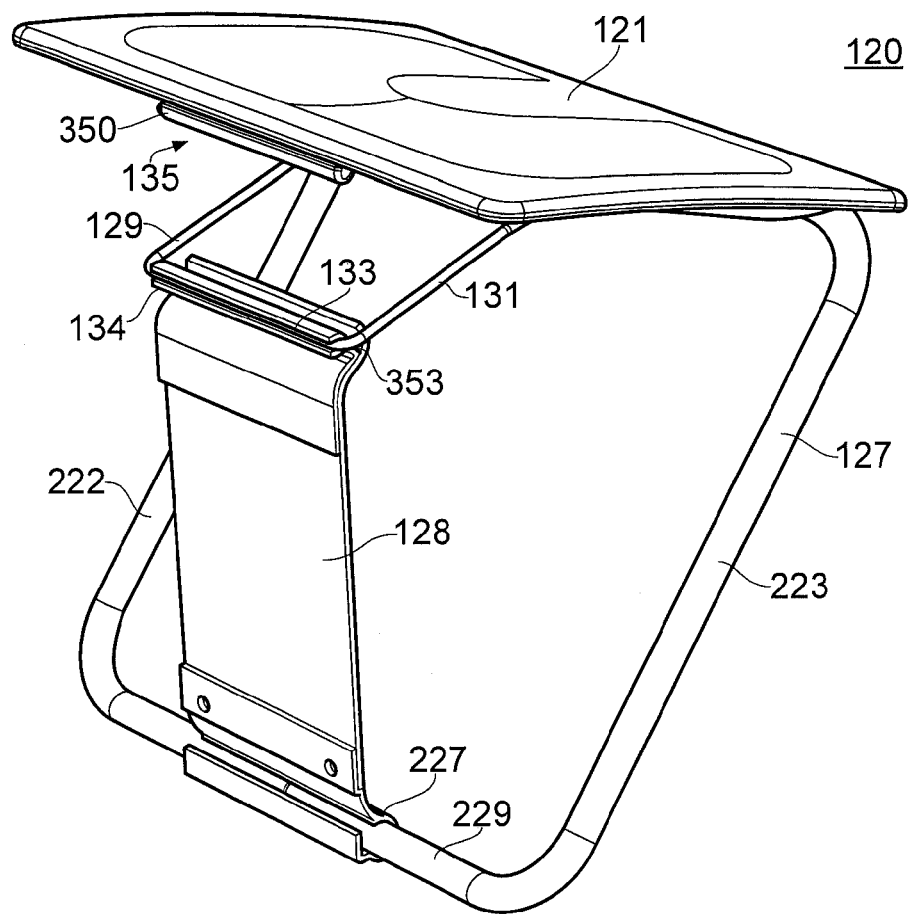
FIG. 14 is a rear perspective view of a foldable support mechanism according to an example in a partially deployed position.
Figure 15:
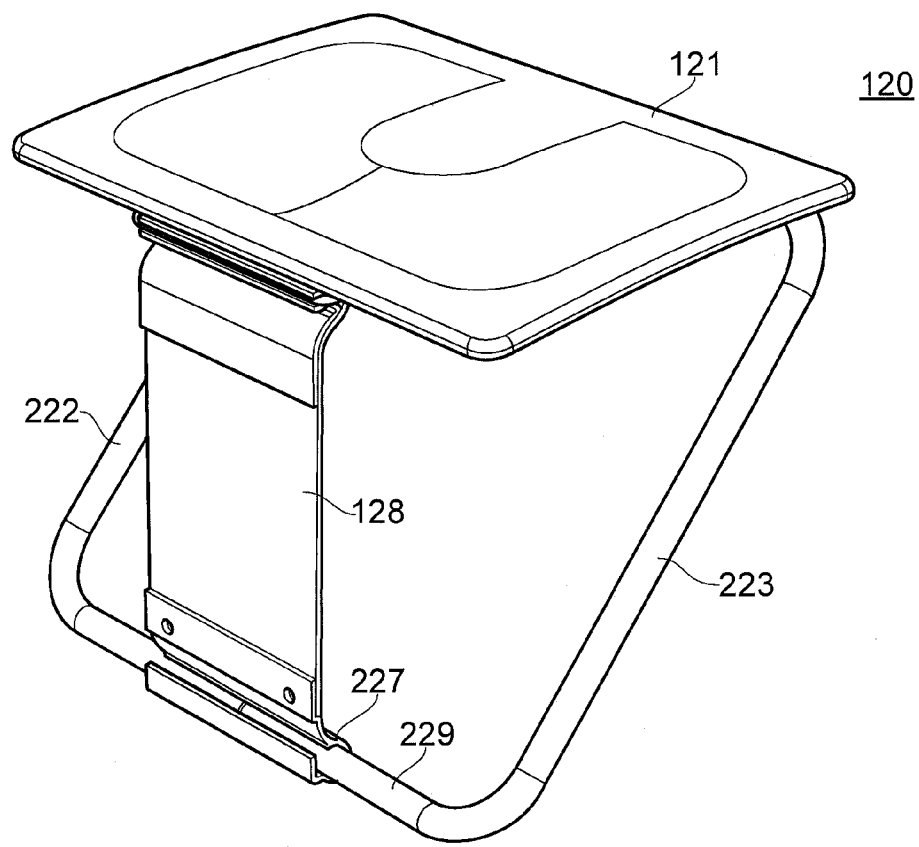
FIG. 15 is a rear perspective view of a foldable support mechanism according to an example in a deployed position.
Figure 16:
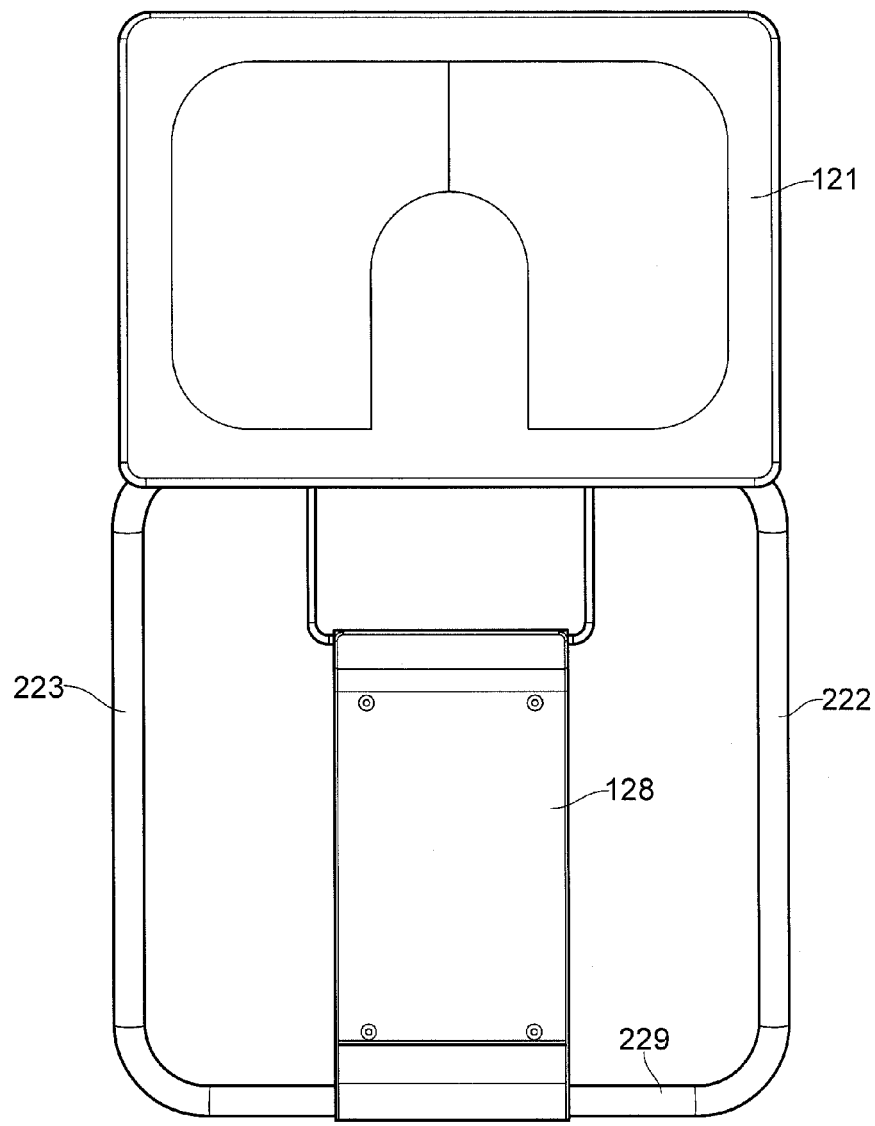
FIG. 16 is a front view of a foldable support mechanism according to an example in a stowed position.
Figure 17:
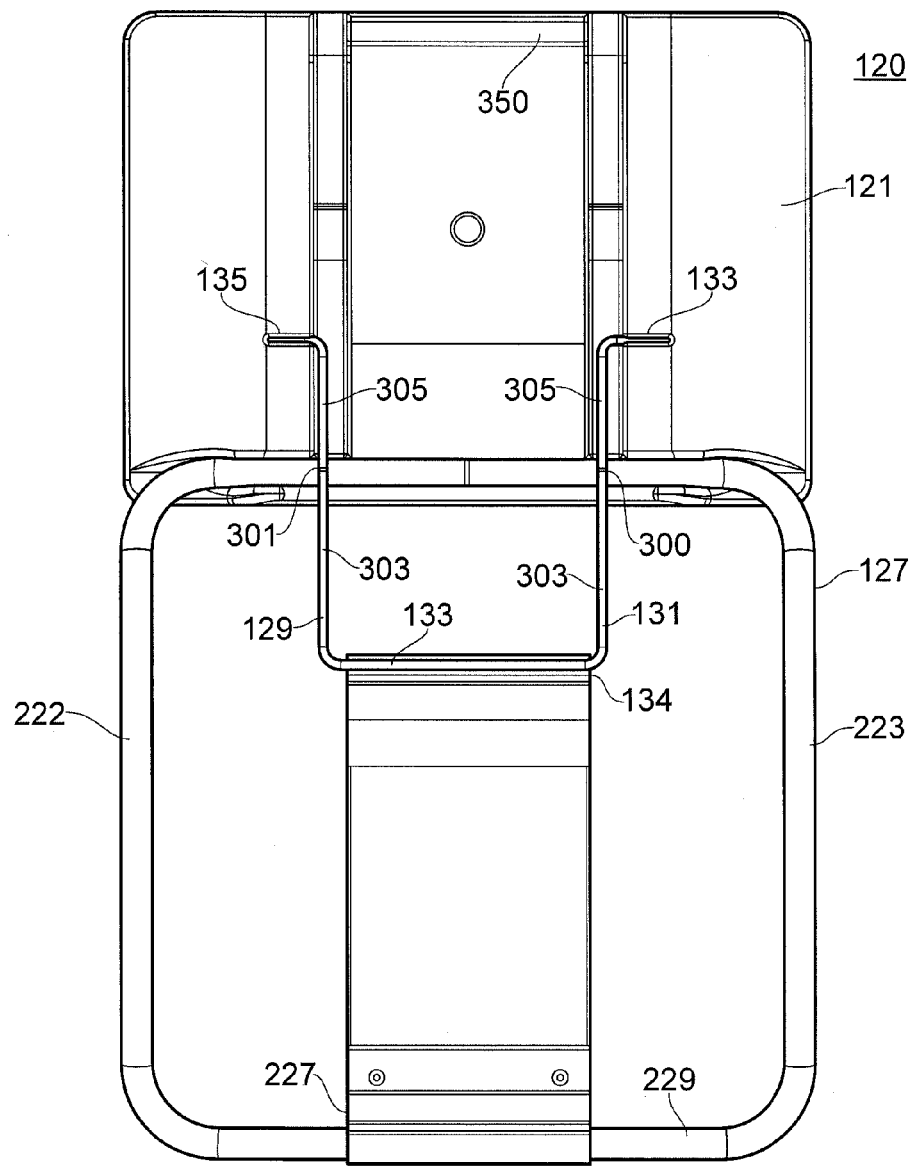
FIG. 17 is a rear view of a foldable support mechanism according to an example in a stowed position.

FIG. 14 is a rear perspective view of a foldable support mechanism according to an example when in a partially deployed position. FIG. 15 is a rear perspective view of a foldable support mechanism according to an example in a deployed position. FIG. 16 is a front view of a foldable support mechanism according to an example in a stowed position. FIG. 17 is a rear view of a foldable support mechanism according to an example in a stowed position.

While various embodiments of the invention have been described, the invention is not limited to such embodiments. Rather, the invention is directed to the following claims and equivalents thereof.

What is claimed is:

1. A foldable support mechanism attachable to a wall or other fixed support, comprising:
   a platform member movable between a substantially horizontal, deployed position and a substantially vertical, stowed position in which the platform member is adjacent to and substantially parallel to the said wall or other fixed support and in which a support surface of the platform member faces away from the said wall or other fixed support; and
   a support structure comprising a quadrilateral linkage composed of four fixed length unitary sections forming two link sections a said platform section and a said wall or other fixed support section, each link pivotally connected at a first end thereof to the platform member section and pivotally connectable directly or indirectly at a second end thereof to the said wall or other fixed support section, in which the links of the said support structure each include respective limbs, the limbs being so formed or so positioned that, in the said stowed position, at least a portion of the said limbs lies in substantially the same plane as one another, parallel to the wall or other fixed support, in which the said limbs are shaped or profiled at the regions where they meet in the stowed position.

2. A foldable support mechanism as claimed in claim 1, in which the said limbs are laterally offset from one another or so shaped that they do not cross one another when in the stowed position.

3. A foldable support mechanism as claimed in claim 2, in which the said two links of the support structure are generally c-shape and orientated such that their respective limbs are laterally offset from one another.

4. A support mechanism as claimed in claim 1 in which the said links of the support structure are shaped as closed loops.

5. A foldable support mechanism as claimed in claim 1, in which the said links are pivotally connected to the platform member, which itself forms one link of the quadrilateral linkage.

6. A foldable support mechanism as claimed in claim 1, in which the said two links of the support structure are each pivotally connected to a mounting member, in the form of a plate or panel, which constitutes one link of the quadrilateral linkage.

7. A foldable support mechanism as claimed in claim 1, in which the pivotal connection of the said two links to the said platform member is a permanent pivotal connection.

8. A foldable support mechanism as claimed in claim 1, in which the said two links are connected to the platform member by a releasable connection.

9. A foldable support mechanism as claimed in claim 1, in which the said platform member is a seat.

10. A foldable support mechanism as claimed in claim 1, in which the platform member has an associated side arm upstanding therefrom.

11. A foldable support mechanism as claimed in claim 6, in which the said mounting member is directly connectable to a wall of an enclosure, or other upright support member.

12. A foldable support mechanism as claimed in claim 1, wherein the support structure includes a platform frame and a strut frame.

13. A foldable support mechanism as claimed in claim 12, wherein the platform frame is fabricated in rod-like form.

14. A foldable support mechanism as claimed in claim 12, wherein the platform frame is profiled so as to include upper and lower portions connected at an elbow and subtending an angle to define a portion of the said frame to meet with corresponding portion of the strut frame.

15. A foldable support mechanism as claimed in claim 1, wherein the platform member includes a protuberance to engage with a receiving portion of a wall mount for the mechanism.

16. A foldable support mechanism as claimed in claim 15, wherein the receiving portion is arranged on an upper portion of the wall mount.

17. A foldable support mechanism as claimed in claim 15, wherein the receiving portion includes a lip to releasably maintain the protuberance within the receiving portion when the platform is deployed.

18. A shower seat configurable between a horizontal, deployed position and a vertical, stowed position, the seat including:
   a platform member including a support surface; and
   a support structure to support the platform member and comprising a quadrilateral linkage composed of four fixed length, unitary sections including first and second links, each said link pivotally connected at a first end thereof to a section of the platform member and pivotally connectable directly or indirectly at a second end thereof to a wall or other fixed support section, in which the links of the said support structure each include a respective limb, the two limbs being so formed or so positioned that, in the said stowed position, at least a portion of the said limbs lies in substantially the same plane as one another, parallel to the wall or other fixed support, and in which the said limbs are shaped or profiled at the regions where they meet in the stowed position.

19. A support structure for a seat or other load-bearing platform, the support structure including two links to pivotally connect to the seat or platform, at least one of which adapted to be pivotally connectable directly or indirectly to a wall or other fixed support, in which the links of the said support structure each include a respective limb, the two limbs being so formed or so positioned that, in a stowed position of the said seat or platform, at least a portion of the said limbs lies in substantially the same plane as one another, parallel to the wall or other fixed support, wherein the said limbs are shaped or profiled at the regions where they meet in the stowed position, said support structure in combination with a said wall or other fixed support and a said seat or other load-bearing platform providing a quadrilateral linkage comprised of four fixed length, unitary sections including:
   one said link comprising a platform frame section of said linkage having a first end pivotally mounted to said wall and a second opposite end pivotally mounted to said seat or platform;
   the other said link comprising a strut frame section of said linkage having a first end
   pivotally attached to the seat or platform and a second end pivotally attached to the wall or other fixed support; said wall or other fixed support thereof comprising a third section of said linkage; and said seat or platform comprising a fourth section of said linkage, said quadrilateral linkage foldable between an open position with said seat or platform supported in a generally horizontal position and a closed position with said strut and platform frame sections substantially in a same plane.

20. The support of claim 19 wherein the seat or platform is in a generally vertical position in the closed position.

\* \* \* \* \*